United States Patent

Morrison et al.

[15] 3,664,855
[45] May 23, 1972

[54] SIZE FOR FIBERS AND GLASS FIBERS COATED THEREWITH

[72] Inventors: Albert R. Morrison, Newark; Harold L. Haynes, Granville, both of Ohio

[73] Assignee: Owens-Corning Fiberglas Corporation

[22] Filed: Dec. 16, 1969

[21] Appl. No.: 885,599

Related U.S. Application Data

[63] Continuation-in-part of Ser. No. 696,156, Jan. 8, 1968, abandoned.

[52] U.S. Cl. ................................. 106/212, 65/3, 106/213, 117/126 GQ
[51] Int. Cl. ......................................................... C09j 3/06
[58] Field of Search ................. 65/3; 106/212, 213; 117/126

[56] References Cited

UNITED STATES PATENTS

| | | | |
|---|---|---|---|
| 3,287,096 | 11/1966 | Marzocchi | 106/212 X |
| 3,461,090 | 8/1969 | Haynes et al | 106/212 X |
| 3,462,283 | 8/1969 | Hjermstad | 106/213 |
| 3,472,682 | 10/1969 | Rammel | 117/126 |

*Primary Examiner*—Theodore Morris
*Attorney*—Staelin & Overman and William P. Hickey

[57] ABSTRACT

A size for lubricating fibers, including glass fibers, which is a water dispersion of a solid unctuous material, as for example a solid wax, fat, or gelled or otherwise solidified oil, and a starch ether of a cyclic hydrocarbon, as for example a starch ether of an aryl compound, an aralkyl compound, an alkaryl compound, a cycloalkyl compound and a cycloalkenyl compound, or homologues thereof. The wax may be an animal, vegetable, mineral, or synthetic wax which is unctuous and insoluble in water. The oils can be gelled by adding any gelling agent, and preferably a thixotropic gelling agent to the oil. The starch ethers or, as the case may be, are only partially cooked so that unburst starch granules are retained, and this dispersion is intimately mixed with the unctuous solid emulsified particles. Other ingredients such as cationic lubricants, coloring matter, bactericides, waxes having particular characteristics, etc. can be added to provide their separate functions. The combination of the above defined partially burst starch granules of etherified starch, and the emulsified particles of the solid unctuous material have very low migration from coated glass fibers, and when dried, provide low tensions when pulled over guide surfaces.

23 Claims, 1 Drawing Figure

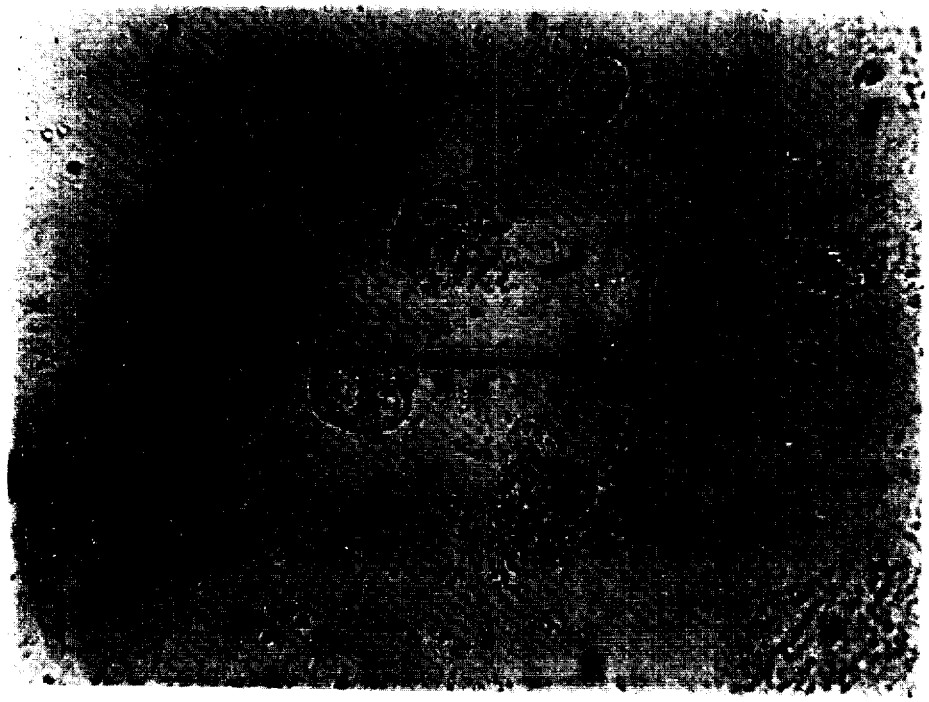

PATENTED MAY 23 1972　　　　　　　　　　　　　　　3,664,855

ALBERT R. MORRISON &
HAROLD L. HAYNES
　　　　　INVENTORS

BY
　　*Staelin & Overman*
　　　　　ATTORNEYS

3,664,855

SIZE FOR FIBERS AND GLASS FIBERS COATED THEREWITH

CROSS REFERENCES TO RELATED APPLICATIONS

The present application is a continuation-in-part application of our copending application Ser. no. 696,156 filed Jan. 8, 1968 now abandoned.

BACKGROUND OF THE INVENTION

Fibers for textiles are made by simultaneously attenuating several hundred small streams of molten glass to produce monofilaments each having a diameter of less than 0.0005 inch. These monofilaments are coated at forming with a protective coating usually comprising a binder and lubricant by pulling the fibers over a pad saturated with the coating. The monofilaments are thereafter brought together into a strand by being pulled through a gathering head and the strand is wound upon a revolving spool or drum which pulls the monofilaments through the above mentioned apparatus. Although glass has a tensile strength of over 400,000 pounds per square inch, prior art strands have never been this strong because of breakage of the monofilaments during forming. Glass is easily broken when scratched and the monofilaments are extremely sensitive to abrasion because of their large surface to volume ratio. Abrasion of the monofilaments may occur either when they are drawn over stationary guide surfaces or when they are rubbed together. Since the glass fibers are subjected to numerous bending operations during their fabrication, and since glass breaks easily when its surface is scratched, any abrasion of the monofilaments may result in fracture of these monofilaments, and the ends adjacent the fracture project outwardly of the strand to produce what is known as fuzz.

Strands of glass fibers produced as above described are subjected to numerous types of twisting, bending, and abrading operations before the strands are woven into a useful textile product. The conditions which are experienced in this multiplicity of rubbing and bending operations are so varied that it is difficult, if not impossible, to produce a single coating lubricant which will completely protect the fibers against breakage during twisting and weaving. The forming coatings must be applied to the filaments from a liquid in order that they will completely coat the filaments. This solution is preferably an aqueous solution in order to obviate explosion and other hazards. Some forming coatings protect the fibers adequately before the water has been removed from the coating, but do poorly in the later stages of the fabricating process where the coating has been dried substantially completely.

The forming packages which are produced as above described are usually allowed to remain under ambient conditions for a sufficient length of time for approximately half of the water to migrate to the surface of the package, so that the remaining water is only approximately 6 percent of the total weight of the package. As the water is moving to the surface of the package, some types of coating materials migrate therewith, to produce a phenomenon known as "migration" wherein the fiber at the outer portion of the package has a higher solids content than does the fiber at the center of the package. A good forming coating must not "migrate" excessively.

After the moisture in the forming package has been reduced to approximately 6 percent, the glass fibers are unwound under ambient conditions and twisted onto a new package. This is called the "twisting" operation. Filaments that are broken during unwinding of the forming package will usually be stripped from the strand into what is known as a "ringer," which then accumulates until the strand breaks. Glass fibers having more than 1 percent water when passing from the forming package through the twisting operation onto the twist package lose moisture to the surrounding air. The fibers on the twist package contain no more than approximately 1 percent water. If more than approximately 1 percent of water remains, shrinkage of the tube onto which it is wound may result, and this shrinkage changes the lay of the fibers to bind the coils together and cause breakage of the strands upon removal from the twist package. Excess moisture in the twisted strands will also cause fuzzing in subsequent operations. If the integrity of the film former is not adequate, the film former will powder during the twisting operation.

The twisted strand from twist packages constitutes the basic material from which glass textiles are made. A plurality of the twisted strands may be brought together to produce a yarn. A plurality of yarns may be simultaneously wrapped upon a cylinder at spaced apart locations to produce a beam, and the beams may thereafter be removed to a loom for use as the warp in a weaving operation. Yarn for the fill will be wrapped into small packages called quills and these will be fed through automatic machinery to the shuttle which glides back and forth across the loom. It will be apparent that in all of these operations, the strands will be pulled over stationary guide surfaces at which time they will be flexed back and forth, and that later while being woven, they will be bent in one direction and then another until the weave is set. A coating lubricant which is too brittle may crack when dry to expose the fibers either to each other or to the guide surfaces, following which breakage is sure to occur. If the coefficient of friction of the coating material is too high with respect to the guide surfaces, the coating will be pulled from the fibers. If the coating is unduly rough, it will be caught by the guide surfaces and pulled from the fibers. In addition, the coating materials must not rub off of the fibers onto the guide surfaces to gum up the textile fabricating machinery, nor must the coatings be too powdery.

Since the assignee of the present invention started making glass fibers commercially, more than 10,000 tests have been made on various materials to develop a water base size which when applied to the fibers, would protect the fibers during forming, twisting, weaving, beaming, quilling, etc., which would produce low tension when pulled through these processes, which would not migrate during drying of the coiled packages, and which would burn-off completely. Prior to the present invention, there has not been a material which would have all of the desirable characteristics, and the sizes which have been developed have been compounded to achieve a desirable compromise for each particular application. The industry has known that soft starch, when used as a coating, has given low tensions when the coated fibers have been pulled through the guide eyes and friction producing structures of the various processing equipment. Soft starches, however, powder excessively and are too easily removed from the fibers. Starches in general also suffer from poor burnoff in that they tend to leave a carbon deposit, which if not uniform is a visual blemish. Cationic lubricants have been known to provide a measure of protection and lower friction in the operations which are performed while the strand is wet. Emulsified wax particles have been added to provide a lubricating effect, but these wax particles at the same time have increased the tension developed when the strand is drawn over guide surfaces.

The art has always had the objective of developing a water solution or dispersion of materials which when applied to the fibers would not migrate, would provide good lubrication to the fibers, would produce low tensions when pulled over guide surfaces, and would burn off completely after the fibers had been processed to a finished configuration, be it a woven structure, mat structure, etc. The prior art has not had a single material which has all of the desirable properties without compromise.

The principal object of the present invention, therefore, is the provision of a new and improved size which has low migration, provides low running tensions, does not powder excessively, and yet provides a relatively tough coating which can be flexed easily without flaking from the fibers.

BRIEF DESCRIPTION OF THE DRAWING

The solitary FIGURE of the drawing is a photomicrograph of a size embodying principles of the present invention and showing a unique cooperation between emulsified wax particles and starch granules.

DESCRIPTION OF THE PREFERRED EMBODIMENTS

It has been discovered, that a unique coaction between starch ethers of cyclic hydrocarbons and homologues thereof is achieved with emulsified particles of a solid unctuous material such as a wax, a fat, or a gelled oil. It has been discovered that granules of a starch ether of a cyclic hydrocarbon or homologues thereof when cooked and allowed to dry do not crystalize into well crystalized rectangular platelets as do other starches, but form basic unit cells which are only attached at their corners to provide a staggered outline. It further appears that cyclic hydrocarbon ethers sufficiently modify the nature of starch as to change it from an oleophobic one to a slightly oleophilic one to make it compatible and have an affinity for solid predominately hydrocarbon unctuous materials. The cyclic hydrocarbons can be attached to the starch through one or more ether linkages. The etherification of the starch can be produced by reaction with alcohols or acids using suitable dehydrating agents, or can be produced using any suitable cyclic material having a reactive group thereon such as: an aldehyde group, an ethylinically unsaturated group, an acetylenic unsaturated group, an epoxy group, a halide group, a keto group, an isocyanate group, an anhydride group, a Grignard group, etc. It appears that the smearing nature of the solid unctuous materials is modified by the semipowdery, dry starch material to provide low tensions when pulled over guide surfaces. On the other hand, the solid particles of unctuous material appear to break up the continuity of the starch coating. The solid nonflowing emulsified particles can be deformed by the starch material on opposite sides thereof when the fibers are flexed without the solid unctuous material flowing to the surface to coat the guide surfaces and thereby cause high tensions.

EXAMPLE 1

To a 41.8 percent dry substance suspension of unmodified Bear Hybrid high amylose corn starch is added 20 percent by weight of sodium chloride based on the water in the suspension. A cool, aqueous 30 percent solution of sodium hydroxide containing 5 percent by weight of NaOH based on the starch solids in the suspension is added with sufficient agitation to insure rapid dispersion of the alkali throughout the suspension. Then 3.9 percent by weight of benzyl chloride based on starch solids is added and the suspension agitated at 60°C for 10 to 20 hours until substantially all of the benzyl chloride has reacted, as determined by the amount of alkali consumed during reaction. The suspension is neutralized with acid, dewatered to a solid cake on a vacuum filter, washed free of salt and dried. The product is obtained in the original granule form.

An etherification of the starch was produced by the reaction of the chlorine of the benzyl chloride with the hydrogen on the OH group of the starch.

An aqueous size is prepared from the following ingredients:

|  | Size | Solids |
|---|---|---|
| Benzyl starch (as produced above) | 3.0% | 52.7 |
| Paraffin Wax (130°F melting point) | 2.0% | 35.0 |
| Polyoxyethylene sorbitan monostearate (emulsifier) | 0.154% | 2.7 |
| Sorbitan monostearate (emulsifier) | 0.146% | 2.6 |
| Cationic lubricant (reaction product of tetraethylene pentamine and stearic acid in a molar ratio 1:2.0) | 0.200% | 3.5 |
| Montan wax (167°-175°F congealing point) (50% emulsion) | 0.200% | 3.5 |

The paraffin wax is melted and brought to a temperature of 180° to 190° F, the cationic lubricant and emulsifying agents are added thereto, and these materials are thoroughly mixed. Boiling water is then added with violent agitation to form an emulsion. Water is added slowly until the inversion is reached, and an additional amount of water is then added.

The starch is partially cooked in a separate pressure kettle at a 6 percent concentration, by raising the temperature at 3° F per minute until a temperature of 250° F is reached. This takes approximately 90 minutes, following which the starch is quenched to a temperature of 150° F. The hot wax emulsion is then added to the cooked starch and the Montan wax emulsion is added. The remainder of the water is added at 150° F, and the ingredients are thoroughly mixed to complete the size preparation. The starch when thus cooked has 75 percent of the original starch granules remaining at least partially unburst. A photomicrograph of a size thus prepared is shown in the drawing.

The size prepared as above described is supplied to a roll type applicator over which 402 filaments from a forming bushing are pulled to coat the filaments. The filaments have a diameter of approximately 0.0003 inch and are of E glass. The coated filaments are drawn together into a strand, and are coiled into a package that is then dried at room temperature for 24 hours. The package has a migration index of 1.16. The dried strand when uncoiled from the package and twisted into a twisted strand in conventional machinery has a fuzz index of 1.0, the best possible rating. The twisted strand when wound into a quill has a tension at the quill of 47 to 51 grams, which is ideal, and has only 8 broken filaments during the quilling operation, which is very good. The same coated, twisted strand when beamed gives very light beaming fuzz, and the beams when woven into fabric using the quilled strand, produces only very light powdering. The fabric when heat cleaned has a burn-off rating of 1 which is the highest possible rating, and exhibits no detectable carbon deposit.

A comparison is made with the same starch as used above excepting that the starch is not reacted into a benzyl ether. The results are shown by the first example of the following Table 1. The properties of other prior art starches are also given in Table 1, followed by the tabulated results of the benzyl starch ether above described.

The fuzz index is determined by counting the number of broken filaments on an 8 inch bobbin. If there are less than 11 broken filaments per bobbin, an index rating of 1 is given, and if there are from 12 to 25 broken filaments per bobbin, an index rating of 2 is given. These ratings are then averaged.

Lindly bug ratings are determined by unwinding 5 of the twist bobbins used for making a beam, for 1 hour at 900 feet per minute and determining the number of bugs per 5 bobbins.

In the Serraplane test, a measured amount of excess binder material is applied to a package in the form of a glob. These fibers are processed and heat cleaned, and the amount of discoloration is noted. A zero rating connotes no streaks, 1 a very light streak, 2 a medium streak, 3 a medium heavy streak, and 4 a heavy streak.

The following examples show that substantially any type of unctuous non water soluble wax can be used.

EXAMPLE 2

The process of Example 1 is repeated excepting that a refined paraffin wax having a melting point of 96° F is used in place of the paraffin wax having a melting point of 130° F. In this instance, the wax emulsion is prepared at 150° F and the properties of the coated strand equals those of the material of Example 1 in every respect.

EXAMPLE 3

The process of Example 1 is repeated excepting that the wax emulsion used is that of a microcrystalline wax having a melting point of 175° F and the emulsion of which is prepared using boiling water. The strand coated with this material has

TABLE I

| | L.O.I. avg. | Mig. index | Twist fuzz | Quilling | | Beaming | | | | | | | | Serraplane | | |
|---|---|---|---|---|---|---|---|---|---|---|---|---|---|---|---|---|
| | | | | Tension | Fuzz | Broken filaments | Tension | | Bugs lindly, hr. | Defects | | | | | | |
| | | | | | | | Start up | Running | | Fuzz | Powder | | | Mig. | Cont. | Color |
| 2.50% unmodified corn cooked 200° F. for ½ hr. at 5% concentration | 1.07 | 1.55 | 1.0 | 44-52 | V.V.L. | 3.3 | 17.4 | 26-30 | 1.2 | V.L. | V.L. | | | 0 | 1½ | Med. |
| 2.50% national HFS | 1.06 | 1.36 | 1.0 | 50-62 | V.L. | 7.0 | 20.0 | 28-32 | 1.2 | V.L. | V.L. | | | 0 | 3 | Light |
| 2.72% hybrid corn 55-45 amylose amylopectin ratio brought up to 254° F. in a pressure cooker and quenched | 1.09 | 1.33 | 1.5 | 78-90 | V.L. med. | 14.0 | 21.4 | 55-65 | 0.4 | V.L. | V.L. | | | 0 | 4 | Med. |
| 2.50% Stein Hall's 3284 | 1.18 | 1.18 | 1.2 | 52-62 | L.V.L. | 3.0 | 13.8 | 27-33 | 0.4 | V.L. | V.L. | | | 0 | 4 | Mod. |
| 2.50% Stein Hall's 3293 | 1.05 | 1.23 | 1.0 | 48-52 | V.L. | 7.7 | 12.8 | 25-31 | 0.6 | Light | V.L. | | | ½ | 4 | Light |
| 3.00% benzylated starch cooked in a pressure kettle brought up to 260° F. and quenched | 0.97 | 1.16 | 1.0 | 47-51 | V.V.L. | 8.0 | 10.4 | 27-35 | 0.2 | Med. | V.L. | | | 0 | 1 | Do. | all of the beneficial properties of that of the material of Example 1, and in addition has slightly better beaming qualities.

EXAMPLE 4

The process of Example 1 is repeated excepting that the wax emulsion used is a hydrogenated sperm oil wax. This material, likewise, gives coated strand of the same general characteristics as that of Example 1.

Vegetable waxes such as Carnauba, Japan, bayberry, candelilla, and other animal waxes such as bees wax, Chinese wax, etc., can be used. Other mineral waxes such as ozocerite, montan, ceresin, etc. can likewise be used. Some advantages are had in using a small amount of the Montan wax in addition to other waxes because of drying characteristics which it imparts. Synthetic waxes such as polyethylenes, polyethylene glycols, and polyoxyethylene esters, chloronaphthalenes, sorbitols, chlorotrifluoroethylene waxes can also be used.

EXAMPLE 5

The process of Example 1 is repeated excepting that propylene glycol alginate is substituted for the combination of emulsifiers used in Example 1. The coated strand has substantially the same properties as does the coated strand of Example 1.

The halogen can be attached to carbon chains of any suitable length, preferably no more than six carbon atoms which in turn are attached to the hydrocarbon ring. The chain can include double bonds.

EXAMPLE 6

Etherification of the starch is implemented using the same procedures given in Example 1 excepting that 3 percent by weight of (3 Chloropropyl) benzene based on the starch solids is used in place of the benzyl chloride. The reaction is carried out at 51° C. The normal propyl benzene starch ether is then substituted for the etherified starch of Example 1 to produce a forming size. This forming size is applied to glass fibers in the same manner as described in Example 1. The sized fibers have the same improved combination of properties as does the product of Example 1.

EXAMPLE 7

An etherified starch is prepared using the same general procedure described in Example 1 excepting that 4 percent by weight of (5 Chloroamyl) benzene based on the starch is substituted for the 3.9 percent of benzyl chloride. The amyl benzene starch ether so formed is then substituted for the benzyl starch ether of Example 1, to make a forming size according to the procedure of Example 1. The fibers so formed have the same improved combination of properties as do the fibers of Example 1.

EXAMPLE 8

The process of producing etherified starch of Example 1 is repeated excepting that 7 percent by weight of 1 phenyl 3 chloro propene-1 based on starch solids is substituted for the benzyl chloride, and the material is reacted for 72 hours at 38° C. In addition, 24 percent by weight of $K_3PO_4$ based on starch solids is substituted for the sodium chloride and sodium hydroxide of Example 1. A forming size is made of the etherified product in the same manner as given in Example 1, and this forming size when applied to glass fibers provides fibers having the same combination of improved properties as does the material of Example 1.

Homologues of benzyl chloride having acyclic or open chain structures, particularly aliphatic side chains, can be used and will produce the same general results so long as the open chain tails have an affinity for the wax, and the tails can intermingle with the long chains of the wax.

EXAMPLE 9

The process of Example 1 is repeated excepting that a material having the following formula is substituted for the benzyl chloride:

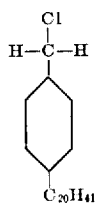

The etherified starch so prepared is then used to make a size using the same procedure given in Example 1. Fibers coated therewith have the same combination of improved properties as do the fibers of Example 1.

EXAMPLE 10

The process of Example 1 is repeated excepting that a material having the following formula is substituted for the benzyl chloride:

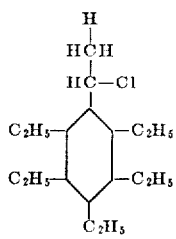

The etherified starch so prepared is then used to make a size using the same procedure given in Example 1, and the coated fibers so formed have the same combination of improved properties as do the fibers of Example 1.

EXAMPLE 11

The process of Example 10 is repeated excepting that a material having $C_{12}H_{25}$ group is substituted for a $C_2H_5$ group of the material used in Example 10.

The etherified starch so formed is then used to make a size using the same procedure given in Example 1, and the fibers so formed have the same improved combination of properties as do the fibers of Example 1.

EXAMPLE 12

The procedure of Example 1 is repeated excepting that a material having the following formula is substituted for the benzyl chloride:

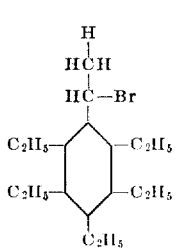

The etherified starch so prepared is then used to make a size using the same procedure given in Example 1, and the fibers so formed have the same combination of improved properties as do the fibers of Example 1.

The halogen may be attached directly to the benzene ring.

EXAMPLE 13

The process of Example 1 is repeated excepting that benzyl iodide is substituted for the benzyl chloride. The etherified starch so prepared is then used to make a size using the same procedure given in Example 1, and the fibers so formed have the same combination of improved properties as do the fibers of Example 1.

The benzene ring and/or side chains can have other functional groups attached thereto, so long as they do not destroy the oleophilic nature of the homologue. These functional groups will include nitrogen, amines, cyanides, halogens, amine groups, and to some extent ether groups, and to a lesser extent OH groups. Anilines and homologues thereof are effective. The following example demonstrates the effectiveness of a nitrate.

EXAMPLE 14

The process of Example 1 is repeated excepting that a material having the following formula is substituted for the benzyl chloride:

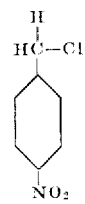

The etherified starch so prepared is then used to make a size using the same procedure given in Example 1, and the fibers coated therewith have the same combination of improved properties as do the fibers of Example 1.

The following example shows that homologues having halogen atoms can be used.

EXAMPLE 15

The process of Example 1 is repeated excepting that benzyl chloride having two additional chlorine atoms on the benzene ring is substituted for the benzyl chloride.

The etherified starch so prepared is then used to make a size using the same procedure given in Example 1, and the fibers coated therewith have the same combination of improved properties as do the fibers of Example 1.

EXAMPLE 16

The process of Example 1 is repeated excepting that 3 chloro cyclohexene is substituted for the benzyl chloride.

The etherified starch so prepared is then used to make a size using the same procedure given in Example 1, and the fibers coated therewith have the same combination of improved properties as do the fibers of Example 1.

EXAMPLE 17

The process of Example 1 is repeated excepting that 3 chloro cyclopentene is substituted for the benzyl chloride.

The etherified starch so prepared is then used to make a size using the same procedure given in Example 1, and the fibers coated therewith have the same combination of improved properties as do fibers of Example 1.

EXAMPLE 18

The process of Example 1 is repeated excepting that 5 chloro 1,3 cyclohexadiene is substituted for the benzyl chloride of Example 1.

The etherified starch so prepared is then used to make a size using the same procedure given in Example 1, and the fibers coated therewith have the same combination of improved properties as do the fibers of Example 1.

EXAMPLE 19

An etherified starch is produced from the following mixture:

| | |
|---|---|
| Pearl Starch | 1000 grams |
| Benzyl Alcohol | 2000 milliliters |
| Pyridine (Catalyst) | 100 grams |
| Formaldehyde | 50 grams |
| (Formalin 37% solution) | |
| $MgCl_2 \cdot 6H_2O$ (Catalyst) | 50 grams |

This mixture was placed in a flask having a reflux condenser. The mixture was stirred while held at a temperature of 80° C plus or minus 2° C for 5 hours. The mixture was then cooled to room temperature and the starch filtered from the slurry. The filtered starch was then slurried in distilled water and refiltered. The starch ether was then dried at room temperature, and an aqueous forming size was produced using the same percentages and procedures given in Example 1. The size was applied to glass fibers at forming also according to the procedure given in Example 1, and the package so produced had generally the same properties as that given in Example 1. The starch ether produced is believed to have the following formula:

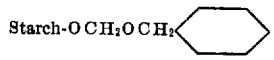

Starch-O $CH_2$ O $CH_2$

EXAMPLE 20

The procedure of Example 19 was repeated excepting that the benzyl alcohol was replaced with the same amount of cyclohexanol. The coated fibers produced from the starch ether of the cyclohexanol had generally the same properties as did the coated fibers of Example 19.

EXAMPLES 21–23

Forming sizes were made using the percentages by weight of the following materials:

| Materials | Example 21 | | Example 22 | | Example 23 | |
|---|---|---|---|---|---|---|
| | size | solids | size | solids | size | solids |
| Benzylated Starch | 0.982 | 15.3 | 2.00 | 33.1 | 1.699 | 26.9 |
| Pearl Starch | 3.500 | 54.7 | 2.00 | 33.1 | 1.699 | 26.9 |
| Rice Starch | 0.234 | 3.66 | | | 1.699 | 26.9 |
| Spermafol wax | 1.174 | 18.3 | | | 0.849 | 13.4 |
| Emulsifier—wax (Durkees ICE No. 2, hydrogenated coconut oil) | 0.140 | 2.2 | 0.20 | 3.31 | 0.163 | 2.58 |
| Nonionic lubricant | 0.088 | 1.38 | 0.25 | 4.13 | 0.059 | .93 |
| Emulsifier for the nonionic lubricant [alkyl phenoxypoly (ethyleneoxy) ethanol] | 0.058 | .9 | | | 0.043 | .67 |
| Cationic lubricant (same as example 1) | 0.208 | 3.25 | 0.20 | 3.31 | 0.149 | 2.4 |
| Spermaceti wax | | | 1.50 | 24.8 | | |

The benzylated starch had benzyl ether substituted for approximately 9.3 percent of the OH groups of the starch. The size was prepared by blending the starch materials in approximately one half of the total water. This mixture was heated to 180° F and let stand for one half hour, following which cold water in approximately one-tenth of the total quantity is added to quench the starch. When so cooked, only approximately 10 percent or less of the starch granules are burst. The cooking is preferably carried out to produce maximum swelling of the starch granules, particularly the rice starch granules, and will have a milky color.

An emulsion of the wax is prepared by heating the was to a temperature of approximately 180° F. The emulsifying agent is stirred into the molten wax, and thereafter boiling water is slowly poured into the wax mixture with violent agitation to form an emulsion. Water is added slowly until the inversion is reached, and thereafter an additional amount of water is added to provide a stable emulsion. An emulsion of the nonionic oil is similarly produced. The starch mixture is cooled to a temperature of approximately 150° F and the wax and/or oil emulsions are then added thereto. The size is then applied to glass fibers at forming as given in Example 1 above. The fibers so produced have substantially the same improved properties as that given in Example 1.

EXAMPLE 24

This example demonstrates that oil thickened to a nonrunny or solid state produces the same general results as does wax. The procedure given in Example 21 was repeated excepting that the Spermafol wax emulsion was replaced with 2 percent of a hydrogenated vegetable oil that was thickened with 5 percent of Thixin R based on the oil. Thixin R is a tradename for an organic thixotrope sold by the Baker Castor Oil Company, and is a high melting (Ca 85° C) ester of castor oil. When cooled to room temperature, the Pureco and Thixin R mixture formed a self-supporting gel so that the emulsified particles of the mixture were solid and did not flow at room temperature. The glass fibers produced using this size mixture has substantially the same properties as did the fibers produced as given in Example 21 above.

Other suitable gelling agents which can be used are: Attapulgite ($3MgO \cdot 1.5 Al_2O_3 \cdot 8 SiO_2 \cdot 9 H_2O$), Baymal Alumina, a copolymer of methyl vinyl ether and maleic anhydride, polysaccharide (Kelzan), Carbopol (a polycarboxylic acid thixotropic agent manufactured by the B.F. Goodrich Chemical Company per U.S. Pat. No. 2,798,053), a microcrystaline cellulose, Bentonite Clay (Benagua), Guar gum, Methocel (a cellulose gum of methyl cellulose, a hydroxypropylmethylcellulose, and hydroxybutylmethylcellulose), and still others as will occur to those skilled in the art.

In general, aqueous sizes for glass fibers will have the following range of compositions:

| | |
|---|---|
| Starch ether | 0.5–7 |
| Starch diluent | 0–6 |
| Solid unctuous material (wax, fats, gelled oils) | 0.3–5 |
| Secondary film former | 0–2 |
| Nonionic oil | 0–0.5 |
| Cationic lubricant | 0.1–0.5 |
| Emulsifying agent | 0.05–0.7 |

As previously stated, the starch ethers are ethers of cyclic hydrocarbons as can be made for example by reacting a sizable percentage of the OH groups of the starch (2 percent or more) with the material of the following general formula:

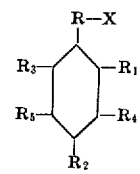

wherein X is any functional group, R is a hydrocarbon having from zero to six carbon atoms inclusive, and $R_1$, $R_2$, $R_3$, $R_4$ and $R_5$ are hydrogens or hydrocarbons having a total carbon content of less than approximately 20.

The starch diluent can be substantially any other starch film former. The starch diluent may be used to cheapen the product, and such diluents can be used, for example, as a pearl starch, rice starch, any underivatized starch, and/or derivatized starches.

The solid unctuous material can be any wax, fat or gelled oil which does not flow at the temperatures at which the coated strand will be used. According to the invention, and as stated previously, it has been found that the solid unctuous materials do not seep to the surface of the guide eyes over which the strand is drawn, and therefore, do not produce high running tensions as does occur when oils are used.

The secondary film former can be any soft film former commonly used in the art, as for example, gelatine, polyvinyl alcohol, Polyox (ethyleneoxide polymers), acrylates, colloidal animal protein, Reten etc. Reten is a cationic polymer prepared from 2.5 percent to 10 percent of cationic monomer, and 90 to 97.5 percent of a nonionic monomer. The cationic monomer is a quaternary prepared from diaminoethyl methacrylate and dimethyl sulfate. The nonionic is acrylamide.

The nonionic oils can be vegetable, animal, or mineral oils, and are preferably hydrogenated to reduce their flowability. These materials are used in general to give abrasion resistance to the coated fibers when dry.

The cationic lubricants may be any of the cationic lubricants as is used in the art to serve principally as a lubricant prior to the time that the coated fibers are dried.

The emulsifying agent for the wax can be any suitable emulsifying agent, preferably a nonionic having an HLB between approximately 3 to 16, and the polyoxyalkylenesorbitans are preferred.

In general, the amount of solids in the aqueous sizes that are applied to the glass fibers can be varied from approximately 2 percent to approximately 12 percent, depending upon the amount of material which it is desired to coat the fibers with, and also to some degree, the type of materials which are used. In general, the solids content of the sizes will have the following percentages by weight:

| | |
|---|---|
| Starch ether | 10–80% |
| Starch diluent | 0–70% |
| Solid unctuous material | 10–40% |
| Secondary film formers | 0–20% |
| Nonionic oils | 0–5% |
| Cationic lubricants | 0–5% |
| Emulsifying agents | 0.5–10% |

Good materials can be made using the following materials in percent by weight: from 10 to 55 percent pearl starch; 1 to 30 percent rice starch; 15 to 75 percent starch ethers; and 10 to 40 percent of unctuous material. Sizes therefrom may contain from 3.5 to 7 percent solids. These sizes will have the following materials in percent by weight: pearl starch 1 to 4 percent; rice starch 0.10 to 2 percent; starch ethers 0.5 to 4.5 percent; and wax 0.8 to 2 percent.

The dried residue that is formed on the fibers will have substantially the same composition as the percent solids by weight given above, excepting that the cationic lubricants, and to a lesser extent the nonionic oil, may be lower due to migration.

The coating that is left on the fibers will, as seen in the drawing, comprise unburst starch granules coated with small emulsified particles of the solid unctuous material, and any nonionic oils present. These coated granules will be cemented together loosely by the starch material from the granules which have been burst, as well as any secondary film formers present. The starch material from the burst granules will hereafter be called solubilized starch, and the solubilized starch when dried around the coated granules produces a powdery surface thereon that is also attracted to the starch ethers to prevent the solid unctuous material from smearing onto the guide surfaces. The solubilized starch and secondary film former are, in a sense, a soft cementing material which surrounds and holds the unburst starch granules coated with the emulsified particles of solid unctuous material together, so that when the coated fibers are bent, the soft nonrunny unctuous material is deformed to take up the foreshortening which occurs by reason of the flexing action. The soft cementing material (solubilized starch and secondary film former) is thereby prevented from being flaked off of the surface of the glass fibers. Any emulsified nonionic oil particles present can, of course, seep to the surface to increase the tension, as desired, and to the extent that the nonionic oil is present. The cationic lubricant is, of course, water soluble and is attracted to glass and metal surfaces, so that the cationic lubricant insures a lubricating effect even though the water should be displaced by pressure over the guide surfaces.

Although a cooperation of the starch ethers of the invention with the wax particles is had when the starch ether or ester granules are burst or dispersed, the preferred materials of the invention will preferably have at least 50 percent of the starch granules swollen but unburst. The best materials have 75 percent or more of the starch present in the form of unburst starch granules, with the most preferred materials having approximately 90 percent or more of the starch granules in the unburst condition.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. Glass fibers having an aqueous coating thereon consisting essentially of solubilized starch; unctuous material from the group consisting of vegetable waxes, animal waxes, mineral waxes, synthetic waxes, fats and gelled oils; and an effective amount of swollen but unburst starch granules of a starch ether of a monocyclic hydrocarbon from the group consisting of five member and six member rings and homologues thereof having substituted aliphatic groups of less than 20 carbon atoms to prevent migration of the unctuous material during drying.

2. The glass fibers of claim 1 wherein the solid unctuous particles are emulsified by a material having an oxyalkylene sorbitan chain.

3. The glass fibers of claim 1 wherein the unctuous material is gelled vegetable oil.

4. The glass fibers of claim 1 wherein the unctuous material is a sperm wax.

5. The glass fibers of claim 4 wherein the emulsifier includes an polyoxyalkylene sorbitan fatty acid having an HLB between 3 and 16.

6. Glass fibers having a coating thereon consisting essentially of the following in approximate percentages on a dry solids weight basis: 10 to 80 percent of swollen granules of a starch ether of a monocyclic radical having the formula

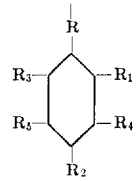

wherein R is a hydrocarbon radical having from 0 to 6 carbon atoms inclusive, and $R_1$, $R_2$, $R_3$, $R_4$ and $R_5$ are hydrogens or aliphatic groups having a total carbon content of less than approximately 20, 0 to 70 percent of solubilized starch, 10 to 40% of a solid unctuous material from the group consisting of vegetable waxes, animal waxes, mineral waxes, synthetic waxes, fats and gelled oils, 0 to 20 percent of a soft water soluble glass fiber sizing secondary film former, 0 to 5 percent of a vegetable, animal, or mineral oil, 0 to 5 percent of a cationic textile lubricant, and 0.5 to 10 percent of an emulsifying agent for the solid unctuous material.

7. The glass fibers of claim 6 having a coating thereon consisting essentially of the following in approximate percentages on a dry solids weight basis: 52.7 percent of swollen granules of the starch ether, 38.5 percent of a solid unctuous material, 3.5 percent of a cationic lubricant, and 5.3 percent of an emulsifying agent.

8. Glass fibers having a coating thereon consisting essentially of the following in approximate percentages on a dry solids weight basis: 15 to 75 percent of swollen granules of a starch ether of a monocyclic radical having the formula,

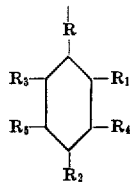

wherein R is a hydrocarbon having from zero to six carbon atoms inclusive, and $R_1$, $R_2$, $R_3$, $R_4$, and $R_5$ are hydrogens or aliphatic groups having a total carbon content of less than approximately 20, 10 to 55 percent of a pearl starch, 1 to 30 percent of rice starch, 10 to 40 percent of a solid unctuous material from the group consisting of vegetable waxes, animal waxes, synthetic waxes, fats and gelled oils 0 to 20 percent of a soft water soluble glass fiber sizing secondary film former, 0 to 5 percent of a cationic textile lubricant, and 0.5 to 10 percent of an emulsifying agent.

9. The glass fibers of claim 8 having a coating thereon consisting essentially of the following in approximate percentages on a dry solids weight basis: 5.3 percent of swollen granules of the starch ether, 54.7 percent of a pearl starch, 3.6 percent of rice starch, 18.3 percent of a solid unctuous material, 1.5 percent of a nonionic lubricant, 3.2 percent of a cationic lubricant, and 3.1 percent of an emulsifying agent.

10. The glass fibers of claim 8 having a coating thereon consisting essentially of the following in approximate percentages on a dry solids weight basis: 33 percent of swollen granules of the starch ether, 33 percent of a pearl starch, 24.8 percent of spermaceti wax, 4.1 of a nonionic lubricant, 3.3 percent of a cationic lubricant, and 3.3 percent of an emulsifying agent.

11. The glass fibers of claim 8 having a coating thereon consisting essentially of the following in approximate percentages on a dry solids weight basis: 27 percent of swollen granules of the starch ether, 27 percent of a pearl starch, 27 percent of rice starch, 13.4 percent of a solid unctuous material, 0.9 percent of a nonionic lubricant, 2.4 percent of a cationic lubricant, and 3.3 percent of an emulsifying agent.

12. An aqueous size having 2 to 12 percent of the following approximate percentages of materials on a dry solids weight basis: 10 to 80 percent of swollen granules of a starch ether of a monocyclic radical having the formula

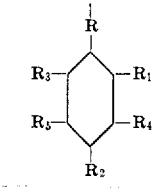

wherein R is a hydrocarbon radical having from zero to six carbon atoms inclusive, and $R_1$, $R_2$, $R_3$, $R_4$ and $R_5$ are hydrogens or aliphatic groups having a total carbon content of less than approximately 20, 0 to 70 percent of other starches, 10 to 40 percent of a solid unctuous material from the group consisting of vegetable waxes, animal waxes, mineral waxes, synthetic waxes, fats and gelled oils, 0 to 20 percent of a secondary film former from the group consisting of polyvinyl alcohol, ethylene oxide polymers, acrylates, animal protein, and an acidified reaction product of an acrylamide, dimethyl sulfate and diaminoethyl methacrylate. 0 to 5 percent of a vegetable, animal or mineral oil, 0 to 5 percent of a cationic textile lubricant, and 0.5 to 10 percent of an emulsifying agent for the solid unctuous material.

13. The aqueous size of claim 12 having 2 to 12% of the following approximate percentages of materials on a dry solids weight basis: 52.7 percent of swollen granules of the starch ether, 38.5 percent of a solid unctuous material, 3.5 percent of a cationic lubricant, and 5.3 percent of an emulsifying agent.

14. An aqueous size having 2 to 12 percent of the following approximate percentages of materials on a dry solids weight basis: 15 to 75 percent of swollen granules of the starch ether, 10 to 55 percent of a pearl starch, 1 to 30 percent of rice starch, 10 to 40 percent of a solid unctuous material, 0 to 20 percent of a secondary film former, 0 to 5 percent of a cationic lubricant, and 0.5 to 10 percent of an emulsifying agent.

15. The aqueous size of claim 14 having 2 to 12 percent of the following approximate percentages of materials on a dry solids weight basis: 15.3 percent of swollen granules of the starch ether, 54.7 percent of a pearl starch, 3.6 percent of rice starch, 18.3 percent of a solid unctuous material, 1.4 percent of a nonionic lubricant, 3.2 percent of a cationic lubricant, and 3.1 percent of an emulsifying agent.

16. The aqueous size of claim 14 having 2 to 12 percent of the following approximate percentages of materials on a dry solids weight basis: 33 percent of swollen granules of the starch ether, 33 percent of a pearl starch, 24.8 percent of a solid unctuous material, 4.1 percent of a nonionic lubricant. 3.3 percent of a cationic lubricant, and 3.3 percent of an emulsifying agent.

17. The aqueous size of claim 14 having 2 to 12 percent of the following approximate percentages of materials on a dry solids weight basis: 27 percent of swollen granules of the starch ether, 27 percent of a pearl starch, 27 percent of rice starch, 13.4 percent of a solid unctuous material, 0.9 percent of a nonionic lubricant, 2.4 percent of a cationic lubricant, and 3.3 percent of an emulsifying agent.

18. In the process of producing glass fibers wherein molten streams of glass are pulled at a high rate of speed during cooling to a solid and are immediately thereafter coated with a lubricant which separates the fibers before the fibers are gathered into a strand that is wound into a coiled package, the improvement wherein the fibers are coated with an aqueous dispersion of solids comprising the following approximate percentages on a weight basis: 10 to 80 percent of swollen granules of a starch ether of a monocyclic radical having the formula

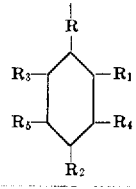

wherein R is a hydrocarbon radical having from zero to six carbon atoms inclusive, and $R_1$, $R_2$, $R_3$, $R_4$ and $R_5$ are hydrogens or aliphatic groups having a total carbon content of less than approximately 20, 0 to 70 percent of other starches, 10 to 40 percent of a solid unctuous material from the group consisting of vegetable waxes, animal waxes, synthetic waxes, fats and gelled oils, 0 to 20 percent of a secondary film former from the group consisting of polyvinyl alcohol, ethylene oxide polymers, acrylates, animal protein, and an acidified reaction product of an acrylamide, dimethyl sulfate and diaminoethyl methacrylate, 0 to 5 percent of a vegetable, animal or mineral oil, 0 to 5 percent of a cationic textile lubricant, and 0.5 to 10 percent of an emulsifying agent for the solid unctuous material.

19. In the process of claim 18, the improvement wherein the fibers are coated with an aqueous dispersion of solids comprising the following approximate percentages on a weight basis: 52.7 percent of swollen granules of a material from the group consisting of starch ethers and esters of a cyclic hydrocarbon, 38.5 percent of a solid unctuous material, 3.5 percent of a cationic lubricant, and 5.3 percent of an emulsifying agent.

20. In the process of producing glass fibers wherein molten streams of glass are pulled at a high rate of speed during cooling to a solid and are immediately thereafter coated with a lubricant which separates the fibers before the fibers are gathered together into a strand that is wound into a coiled package, the improvement wherein the fibers are coated with an aqueous dispersion of solids comprising the following approximate percentages on a weight basis: 15 to 75 percent of swollen granules of a starch ether of a monocyclic radical having the formula

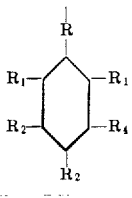

wherein R is a hydrocarbon radical having from zero to six carbon atoms inclusive, and $R_1$, $R_2$, $R_3$, $R_4$ and $R_5$ are hydrogens or aliphatic groups having a total carbon content of less than approximately 20, 10 to 55 percent of a pearl starch, 1 to 30 percent of rice starch, 10 to 40 percent of a solid unctuous material from the group consisting of vegetable waxes, animal waxes, mineral waxes, synthetic waxes, fats and gelled oils, 0 to 20 percent of a secondary film former from the group consisting of polyvinyl alcohol, ethylene oxide polymers, acrylates, animal protein, and an acidified reaction product of an acrylamide, dimethyl sulfate and diaminoethyl methacrylate, 0 to 5 percent of a cationic textile lubricant, and 0.5 to 10 percent of an emulsifying agent for the solid unctuous material.

21. In the process of claim 20, the improvement wherein the fibers are coated with an aqueous dispersion of solids comprising the following approximate percentages on a weight basis: 15.3 percent of swollen granules of the starch ether, 54.7 percent of a pearl starch, 3.5 percent of rice starch, 18.3 percent of a solid unctuous material, 1.4 percent of a nonionic lubricant, 3.2 percent of a cationic lubricant, and 3.1 percent of an emulsifying agent.

22. In the process of claim 20, the improvement wherein the fibers are coated with an aqueous dispersion of solids comprising the following approximate percentages on a weight basis: 33 percent of swollen granules of the starch ether, 33 percent of a pearl starch, 24.8 percent of a solid unctuous material, 4.1 percent of a nonionic lubricant, 3.3 percent of a cationic lubricant, and 3.3 percent of an emulsifying agent.

23. In the process of claim 20, the improvement wherein the fibers are coated with an aqueous dispersion of solids comprising the following approximate percentages on a weight basis: 27 percent of swollen granules of the starch ether, 27 percent of a pearl starch, 27 percent of rice starch, 13.4 percent of a solid unctuous material, 0.9 percent of a nonionic lubricant, 2.4 percent of a cationic lubricant, and 3.3 percent of an emulsifying agent.

* * * * *